(12) United States Patent
Lee (10) Patent No.: US 12,434,306 B2
(45) Date of Patent: Oct. 7, 2025

(54) CUTTING TOOL ASSEMBLY

(71) Applicant: TAEGUTEC LTD., Daegu (KR)

(72) Inventor: Sang Young Lee, Daegu (KR)

(73) Assignee: TaeguTec Ltd., Daegu (KR)

( * ) Notice: Subject to any disclaimer, the term of this patent is extended or adjusted under 35 U.S.C. 154(b) by 589 days.

(21) Appl. No.: 18/049,333

(22) Filed: Oct. 25, 2022

(65) Prior Publication Data

US 2024/0131599 A1 Apr. 25, 2024
US 2024/0227032 A9 Jul. 11, 2024

(51) Int. Cl.
| | |
|---|---|
| *B23B 29/04* | (2006.01) |
| *B23B 27/10* | (2006.01) |
| *B23B 27/16* | (2006.01) |
| *B23B 27/04* | (2006.01) |

(52) U.S. Cl.
CPC ............ *B23B 29/043* (2013.01); *B23B 27/04* (2013.01); *B23B 27/10* (2013.01); *B23B 2205/02* (2013.01); *B23B 2220/126* (2013.01)

(58) Field of Classification Search
CPC ... B23B 29/043; B23B 2205/02; B23B 27/04; B23B 27/10; B23B 2220/126; B23B 2260/124; B23B 2205/04
See application file for complete search history.

(56) References Cited

U.S. PATENT DOCUMENTS

| | | | | |
|---|---|---|---|---|
| 5,112,164 | A * | 5/1992 | Pano | B23B 27/04 |
| | | | | 82/160 |
| 5,709,508 | A * | 1/1998 | Barazani | B23B 27/10 |
| | | | | 407/112 |
| 5,921,724 | A * | 7/1999 | Erickson | B23B 27/04 |
| | | | | 407/117 |
| 6,261,032 | B1 | 7/2001 | Duwe et al. | |

(Continued)

FOREIGN PATENT DOCUMENTS

| | | | | |
|---|---|---|---|---|
| CN | 107999797 B | | 5/2019 | |
| DE | 202012004900 U1 * | | 6/2012 | ............ B23B 27/10 |

(Continued)

OTHER PUBLICATIONS

International Search Report issued Jan. 17, 2024 in counterpart PCT Application No. PCT/KR2023/015835.

*Primary Examiner* — Sara Addisu
(74) *Attorney, Agent, or Firm* — Womble Bond Dickinson (US) LLP (57) ABSTRACT

A cutting tool assembly includes: a tool body extending in a longitudinal direction; a lower jaw extending and protruding forward from the tool body; a clamping portion disposed to be spaced apart from a top surface of the tool body; an upper jaw extending forward from the clamping portion and facing the lower jaw; an elastic connecting portion elastically connecting the tool body and the clamping portion to each other on a rear side of the clamping portion; a clamping screw penetrating the clamping portion downwardly and (Continued)

fastened to the tool body; and an upper coolant channel through which coolant flows, the upper coolant channel penetrating the elastic connection part, the clamping portion, and the upper jaw. In a width direction perpendicular to the longitudinal direction, a width of the clamping portion is in a range of 40% to 80% of a width of the tool body.

17 Claims, 6 Drawing Sheets

(56) References Cited

U.S. PATENT DOCUMENTS

| | | | | |
|---|---|---|---|---|
| 8,079,785 | B2* | 12/2011 | Nicholas | B23B 29/043 407/101 |
| 9,180,523 | B2* | 11/2015 | Gustavsson | B23B 29/043 |
| 9,259,788 | B2* | 2/2016 | Malka | B23B 27/10 |
| 9,475,123 | B2* | 10/2016 | Sevdic | B23B 27/1625 |
| 10,029,312 | B2* | 7/2018 | Thelin | B23B 27/10 |
| 2008/0003068 | A1* | 1/2008 | Nagaya | B23B 29/043 407/110 |
| 2008/0124180 | A1* | 5/2008 | Breisch | B23B 27/10 408/713 |
| 2008/0131215 | A1* | 6/2008 | Sjoo | B23B 29/043 407/117 |
| 2012/0260778 | A1 | 10/2012 | Uno | |
| 2014/0064862 | A1* | 3/2014 | Breisch | B23B 27/1666 407/11 |
| 2014/0099168 | A1* | 4/2014 | Schaefer | B23B 29/043 407/11 |
| 2014/0321926 | A1* | 10/2014 | Sadikov | B23B 27/1666 407/107 |
| 2016/0175938 | A1* | 6/2016 | Kaufmann | B23B 27/10 407/11 |
| 2019/0001454 | A1* | 1/2019 | Huang | B23B 27/10 |
| 2020/0180040 | A1* | 6/2020 | Andoh | B23B 27/10 |
| 2021/0220921 | A1* | 7/2021 | Luik | B23B 27/10 |
| 2021/0260668 | A1* | 8/2021 | Henger | B23B 27/045 |
| 2023/0302546 | A1* | 9/2023 | Basavaraju | B23B 27/086 |
| 2023/0347426 | A1* | 11/2023 | Kiso | B23C 3/28 |
| 2025/0114845 | A1* | 4/2025 | Ida | B23B 27/1677 |

FOREIGN PATENT DOCUMENTS

| | | | | | |
|---|---|---|---|---|---|
| DE | 102014116915 | A1 | * | 5/2016 | B23B 29/043 |
| DE | 102014119295 | A1 | * | 6/2016 | B23B 27/1625 |
| DE | 202018105949 | U1 | * | 1/2020 | B23B 27/04 |
| EP | 2803432 | A1 | * | 11/2014 | B23B 31/305 |
| EP | 2898967 | A1 | * | 7/2015 | B23B 27/10 |
| EP | 2 988 896 | B1 | | 12/2019 | |
| EP | 3575022 | A1 | * | 12/2019 | B23B 27/1644 |
| EP | 3693110 | A1 | * | 8/2020 | B23B 27/16 |
| JP | 2021037568 | A | * | 3/2021 | B23B 27/16 |
| WO | WO-2013114353 | A1 | * | 8/2013 | B23B 29/043 |
| WO | WO-2016121663 | A1 | * | 8/2016 | B23B 27/16 |
| WO | WO-2018159525 | A1 | * | 9/2018 | B23B 27/10 |

* cited by examiner

CUTTING TOOL ASSEMBLY

TECHNICAL FIELD

The present disclosure relates to a cutting tool assembly for grooving.

BACKGROUND

In the field of cutting tools, grooving refers to various machining fields such as groove machining, cutting machining, turning machining and turn-grooving. In general, a cutting tool assembly for grooving includes a cutting insert and a tool body on which the cutting insert is mounted. The tool body includes: a lower jaw supporting the bottom surface of the cutting insert; a clamping portion spaced apart from the top surface of the tool body; an upper jaw extending forward from the clamping portion to press the top surface of the cutting insert; and an elastic connecting portion elastically connecting the clamping portion to the tool body; and a clamping screw penetrating downwardly the clamping portion to be fastened to the tool body.

SUMMARY

In a conventional cutting tool assembly for grooving, a coolant channel may be formed inside the elastic connection portion, the clamping portion and the upper jaw. In order to form a coolant channel having an inner diameter for allowing high-pressure coolant to flow smoothly, it is necessary to increase the thickness of the elastic connecting portion. When the thickness of the elastic connecting portion is increased, the rigidity of the elastic connecting portion increases. Thus, the amount of elastic deformation of the elastic connecting portion decreases. As a result, it is difficult to ensure a sufficient distance between the upper jaw and the lower jaw for inserting a cutting insert. In order to easily insert the cutting insert into a space between the upper jaw and the lower jaw in a state in which the thickness of the elastic connecting portion is increased, it is necessary to increase the length of the clamping portion. When the length (i.e., the overhang) from the elastic connecting portion to the upper jaw is increased, the lifespan of the cutting insert is shortened and the quality of the workpiece (e.g., surface roughness) is deteriorated.

Various embodiments of the present disclosure improve or solve at least some problems of the conventional cutting tool assembly for grooving. To this end, various embodiments of the present disclosure provide a cutting tool assembly.

Embodiments according to one aspect of the present disclosure are directed to a cutting tool assembly. The cutting tool assembly according to an exemplary embodiment includes: a tool body extending in a longitudinal direction; a lower jaw extending and protruding forward from the tool body; a clamping portion disposed to be spaced apart from a top surface of the tool body; an upper jaw extending forward from the clamping portion and facing the lower jaw; an elastic connecting portion elastically connecting the tool body and the clamping portion to each other on a rear side of the clamping portion; a clamping screw penetrating the clamping portion downwardly and fastened to the tool body; and an upper coolant channel through which coolant flows, the upper coolant channel penetrating an interior of the elastic connection part, an interior of the clamping portion and an interior of the upper jaw. In a width direction perpendicular to the longitudinal direction, a width of the clamping portion is in a range of 40% to 80% of a width of the tool body.

In one embodiment, the clamping screw, the elastic connecting portion, the upper jaw and the clamping portion may be configured to satisfy Equation 1 below.

$$\frac{A+T}{T} < \frac{L2}{T} < L2 - \frac{L1}{T}, \quad \text{Equation 1}$$

wherein, in Equation 1 above,
A is a diameter of a threaded portion of the clamping screw,
T is a thickness of the elastic connecting portion,
L1 is a width of the upper jaw, and
L2 is the width of the clamping portion.

In one embodiment, the clamping portion and the elastic connecting portion may be configured to satisfy Equation 2 below.

$$2 \le \frac{L2}{T} \le 25, \quad \text{Equation 2}$$

wherein, in Equation 2 above,
L2 is the width of the clamping portion, and
T is a thickness of the elastic connecting portion.

In one embodiment, the clamping screw and the elastic connecting portion may be configured to satisfy Equation 3 below.

$$2 \le \frac{A+T}{T}, \quad \text{Equation 3}$$

to wherein, in Equation 3 above,
A is a diameter of a threaded portion of the clamping screw, and
T is a thickness of the elastic connecting portion.

In one embodiment, the upper jaw, the elastic connecting portion, and the clamping portion may be configured to satisfy Equation 4 below.

$$L2 - \frac{L1}{T} \le 25, \quad \text{Equation 4}$$

wherein, in Equation 4 above,
L1 is a width of the upper jaw,
T is a thickness of the elastic connecting portion, and
L2 is the width of the clamping portion.

In one embodiment, the clamping portion and the clamping screw may be configured to satisfy Equation 5 below.

$$\frac{L4}{T} < 3.5, \quad \text{Equation 5}$$

wherein, in Equation 5 above,
L4 is a length from a rear end of the clamping portion to a center of the clamping screw, and
T is a thickness of the elastic connecting portion.

In one embodiment, the width of the clamping portion may be longer than a width of the upper jaw, while the width of the tool body may be greater than the width of the clamping portion.

In one embodiment, in the clamping portion, a length along the longitudinal direction may be greater than a width along the width direction.

In one embodiment, the upper coolant channel may include: a first upper coolant channel formed inside the elastic connecting portion, the first upper coolant channel being perpendicular to a top surface of the clamping portion; a second upper coolant channel formed inside the clamping portion, the second upper coolant channel being perpendicular to the first upper coolant channel; and a third upper coolant channel formed inside the upper jaw, the third upper coolant channel being inclined downward with respect to the second upper coolant channel.

In one embodiment, the cutting tool assembly may further include a lower coolant channel penetrating inside of the tool body and the lower jaw.

In one embodiment, the cutting tool assembly may further include a cutting insert inserted into a space between the lower jaw and the upper jaw.

BRIEF DESCRIPTION OF DRAWINGS

The accompanying drawings, which are incorporated in and constitute a part of the specification, illustrate embodiments of the present disclosure, and together with the general description given above and the detailed description of the embodiments given below, serve to explain the principles of the present disclosure.

DETAILED DESCRIPTION

Embodiments of the present disclosure are illustrated for the purpose of explaining the technical idea of the present disclosure. The scope of the rights according to the present disclosure is not limited to the embodiments presented below or the detailed descriptions of such embodiments.

All the technical terms and scientific terms in the present disclosure include meanings or definitions that are commonly understood by those of ordinary skill in the art unless otherwise defined. All terms in the present disclosure are selected for the purpose of describing the present disclosure more clearly, and are not selected to limit the scope of the present disclosure.

As used in the present disclosure, expressions such as "comprising," "including," "having" and the like are to be understood as open-ended terms having the possibility of encompassing other embodiments, unless otherwise mentioned in the phrase or sentence containing such expressions.

The singular expressions that are described in the present disclosure may encompass plural expressions unless otherwise stated, which will be also applied to the singular expressions recited in the claims.

The expressions, such as "first," "second," etc., which are shown in various embodiments of the present disclosure, are used to separate a plurality of elements from each other, and are not intended to limit an order or importance of the corresponding elements.

The directional term "rearward," "rear," etc., used herein is based on a direction along the X-axis in the accompanying drawings, the directional term "forward," "front," etc., means a direction opposite to the rearward or rear direction. The directional term "upward," "upper," etc., used herein is based on a direction along the X-axis in the accompanying drawings, the directional term "downward," "lower," etc., means a direction opposite to the upward or upper direction. Further, "a longitudinal direction" means a direction extending along the X-axis in the accompanying drawings, "a width direction" means a direction extending along the Y-axis in the accompanying drawings. A cutting tool assembly shown in the accompanying drawings may be otherwise oriented and the above-described directional terms may be interpreted accordingly.

Hereinafter, embodiments of the present disclosure will be described with reference to the accompanying drawings. In the accompanying drawings, like or relevant components are indicated by like reference numerals. In the following description of embodiments, repeated descriptions of the identical or relevant components will be omitted. However, even if a description of a component is omitted, such a component is not intended to be excluded in an embodiment.

Figure 1:
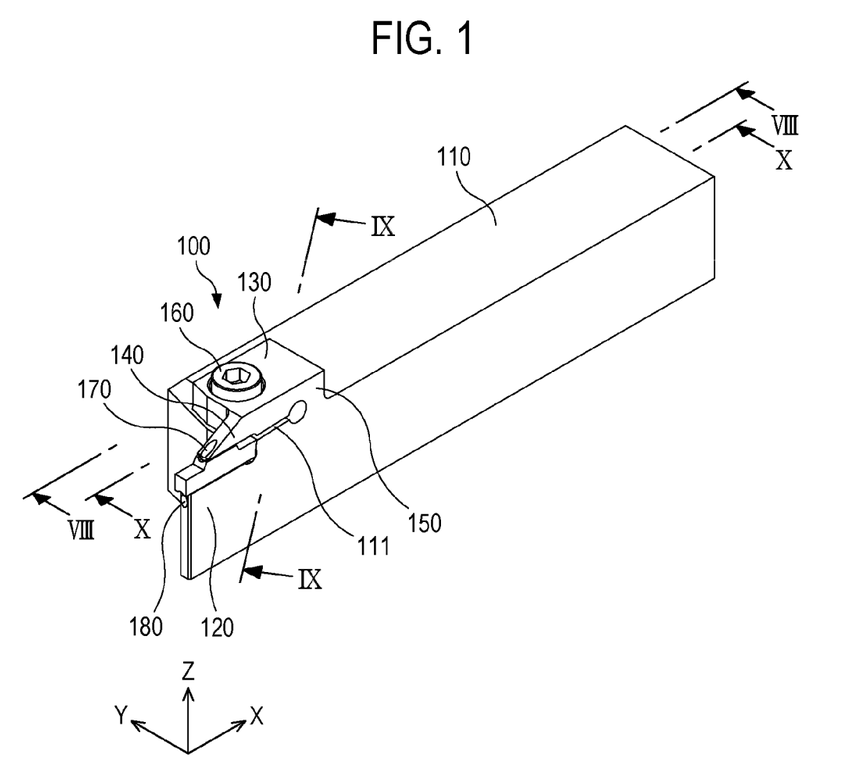
FIG. 1 is a perspective view showing a cutting tool assembly according to one embodiment of the present disclosure.
Figure 2:
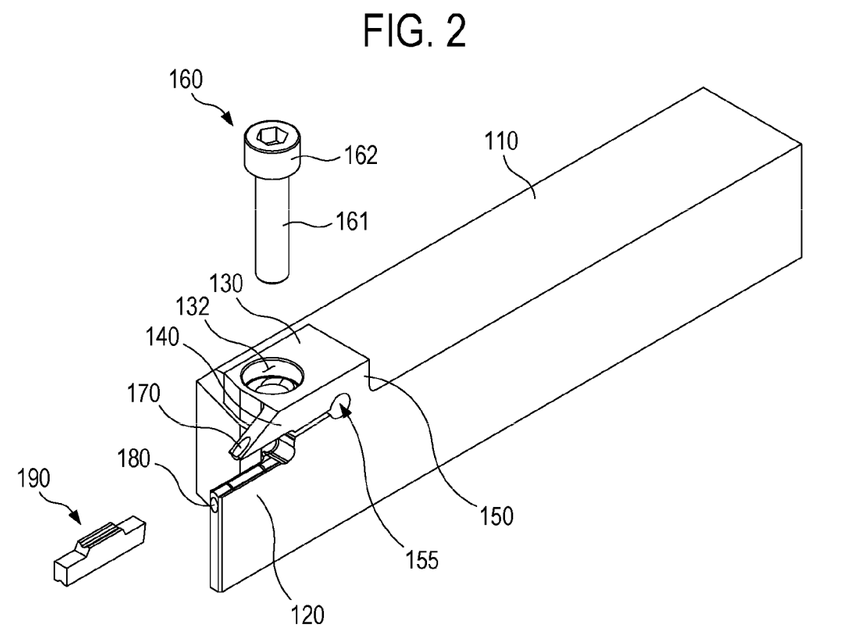
FIG. 2 is an exploded perspective view showing the cutting tool assembly shown in FIG.

FIG. 1 is a perspective view showing a cutting tool assembly according to an embodiment of the present disclosure. FIG. 2 is an exploded perspective view showing the cutting tool assembly shown in FIG. 1.

Referring to FIGS. 1 and 2, a cutting tool assembly 100 according to an embodiment of the present disclosure includes a tool body 110, a lower jaw 120, a clamping portion 130, an upper jaw 140, an elastic connecting portion 150, a clamping screw 160 and an upper coolant channel 170.

The tool body 110 extends longitudinally. The tool body 110 has a rectangular pillar shape and is also referred to as a shank. The tool body 110 is mounted on a cutting apparatus such as a lathe to be used to cut a workpiece.

Figure 3:
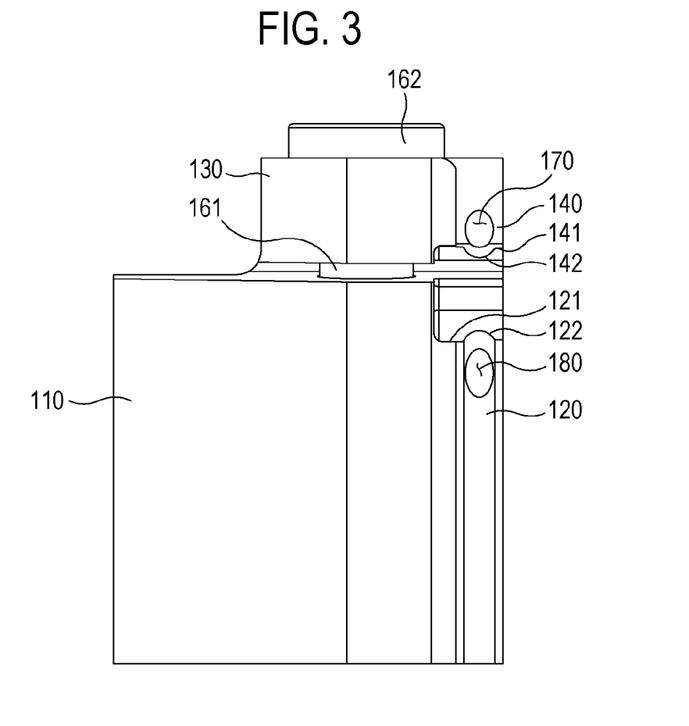
FIG. 3 is a front view showing the cutting tool assembly shown in FIG. 1.
Figure 4:
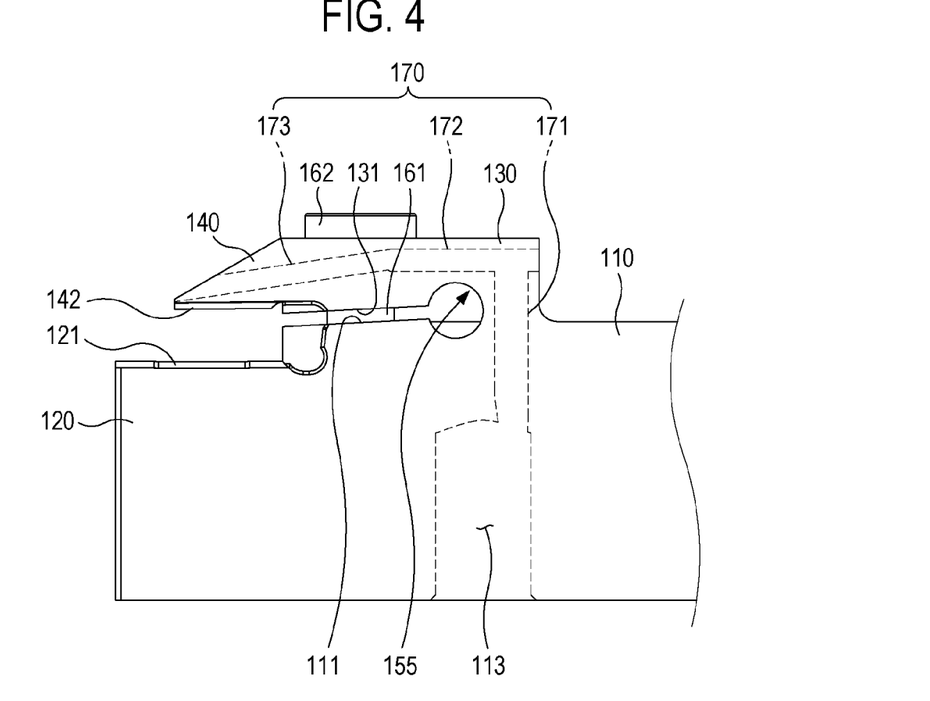
FIG. 4 is a partial side view showing the cutting tool assembly shown in FIG. 1.

FIG. 3 is a front view showing the cutting tool assembly shown in FIG. 1. FIG. 4 is a partial side view showing the cutting tool assembly shown in FIG. 1. In FIGS. 3 and 4, a cutting insert is omitted in order to show the structures of the lower jaw and the upper jaw.

The lower jaw 120 extends and protrudes forward from the tool body 110. The lower jaw 120 is formed integrally with the tool body 110 and may be understood as one portion of the tool body 110. The lower jaw 120 is configured to support a bottom surface of a cutting insert 190. In one embodiment, as shown in FIG. 3, the lower jaw 120 may include a support surface 121 and a support protrusion 122 protruding upward from the support surface 121. The support protrusion 122 is formed over one portion or the whole of the support surface 121 and extends along the longitudinal direction. The support protrusion 122 may have a cross-sectional shape corresponding to a cross-sectional shape of a groove formed in the bottom surface of the cutting insert 190.

The clamping portion 130 is disposed to be spaced apart from a top surface 111 of the tool body 110. As shown in FIG. 4, before and after the cutting insert 190 is mounted on a space between the lower jaw 120 and the upper jaw 140, a predetermined distance is maintained between the bottom surface 131 of the clamping portion 130 and the top surface 111 of the tool body 110. When the cutting insert 190 is mounted on the tool body 110, the gap between a bottom surface 131 of the clamping portion 130 and the top surface 111 of the tool body 110 is widened. A through hole 132 is formed in the clamping portion 130 in the vertical direction so that the clamping screw 160, which will be described later, passes therethrough.

The upper jaw 140 extends forward from the clamping portion 130 and faces the lower jaw 120. The upper jaw 140 is formed integrally with the clamping portion 130 and may be understood as one portion of the clamping portion 130. The upper jaw 140 is configured to press the top surface of the cutting insert 190 downward. In one embodiment, as shown in FIG. 3, the upper jaw 140 may include a pressing surface 141 and a pressing protrusion 142 protruding downward from the pressing surface 141. The pressing protrusion 142 is formed over one portion or the whole of the pressing surface 141 and extends along the longitudinal direction. The pressing protrusion 142 may have a cross-sectional shape corresponding to the cross-sectional shape of the groove formed in the top surface of the cutting insert 190.

The elastic connecting portion 150 elastically connects the tool body 110 and the clamping portion 130 to each other at the rear side (e.g., the rear end portion) of the clamping portion 130. The elastic connecting portion 150 is formed integrally with the tool body 110 and the clamping portion 130. The elastic connecting portion 150 is configured to provide an elastic force such that the gap between the top surface 111 of the tool body 110 and the bottom surface 131 of the clamping portion 130 is widened when the cutting insert 190 is mounted on the space between the lower jaw 120 and the upper jaw 140. Further, the elastic connecting portion 150 is configured to provide an elastic restoring force such that the gap between the top surface 111 of the tool body 110 and the bottom surface 131 of the clamping portion 130 returns to an original gap after the cutting insert 190 is mounted on the space between the lower jaw 120 and the upper jaw 140. In order to provide a sufficient elastic force and a sufficient elastic restoring force, an undercut 155 may be formed in a portion in which the top surface 111 of the tool body 110, a front surface of the elastic connecting portion 150, and the bottom surface 131 of the clamping portion 130 meet one another.

The clamping screw 160 penetrates the clamping portion 130 downward and is fastened to the tool body 110. The clamping screw 160 fixes the clamping portion 130 with respect to the tool body 110 in a state in which the cutting insert 190 is mounted on the space between the lower jaw 120 and the upper jaw 140. The clamping screw 160 includes a threaded portion 161 that is screwed to the tool body 110 and a head 162 located above the threaded portion 161. A screw hole 112 to which the threaded portion 161 of the clamping screw 160 is fastened is formed in the tool body 110. The position of the clamping screw 160 may be determined in consideration of the size of the clamping portion 130 and the position of the upper coolant channel 170, which will be described later.

The upper coolant channel 170 penetrates an interior of the elastic connecting portion 150, an interior of the clamping portion 130, and an interior of the upper jaw 140. Coolant flows through the upper coolant channel 170. The coolant, which flows through the upper coolant channel 170, may be injected from the upper jaw 140 to a position where a cutting edge of the cutting insert 190 and the workpiece meet each other. By injecting the coolant, it is possible to improve the cutting performance of the cutting insert 190 and to prolong the lifespan of the cutting insert 190. In addition, due to using the coolant, it is possible to generate and discharge chips smoothly. In one embodiment, the coolant may be injected at a pressure of up to 300 bar.

Figure 5:
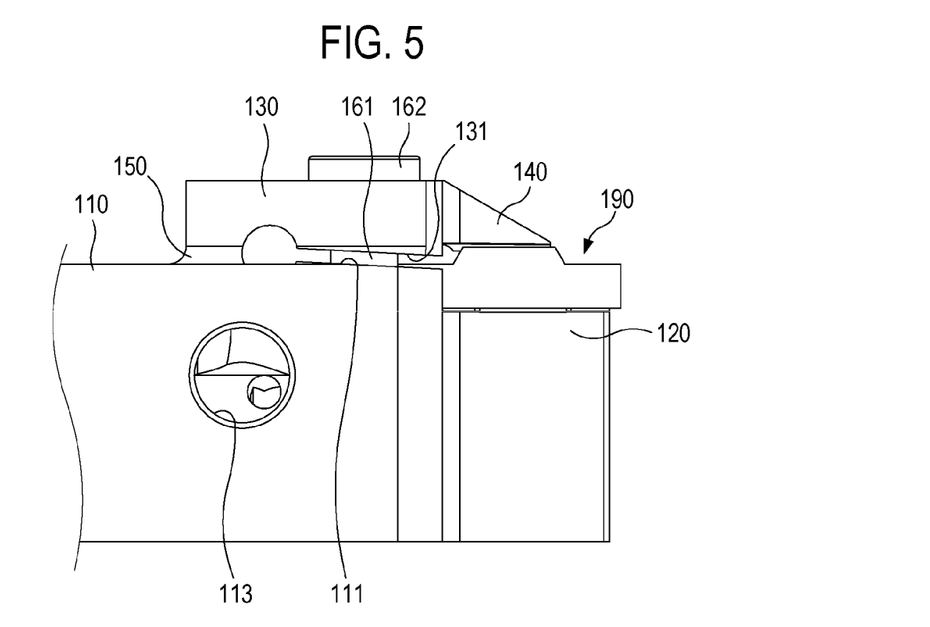
FIG. 5 is a partial side view of the cutting tool assembly shown in FIG. 1 when viewed from another side.
Figure 6:
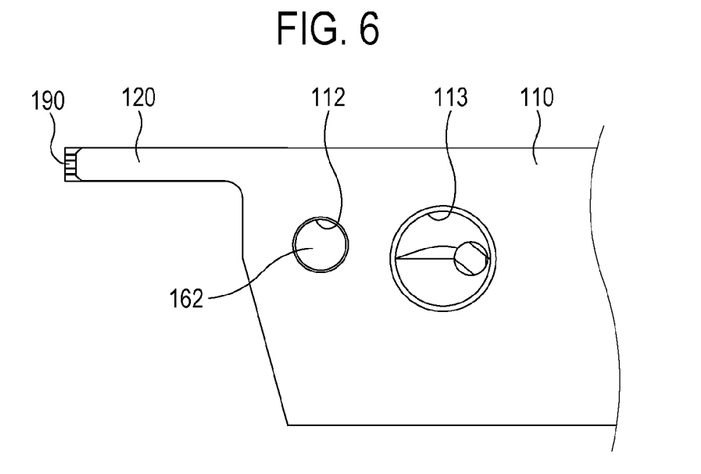
FIG. 6 is a partial bottom view of the cutting tool assembly shown in FIG. 1.

FIG. 5 is a partial side view of the cutting tool assembly shown in FIG. 1 when viewed from another side. FIG. 6 is a partial bottom view of the cutting tool assembly shown in FIG. 1.

In one embodiment, a coolant supply channel 113 communicating with the upper coolant channel 170 formed in the elastic connecting portion 150 may be formed in an interior of the tool body 110. The coolant supply channel 113 may be formed to communicate up to a side surface (see FIG. 5) and/or the bottom surface (see FIG. 6) of the tool body 110. A coolant supply pipe is connected to the coolant supply channel 113 formed in the side surface and/or the bottom surface of the tool body 110.

Figure 7:
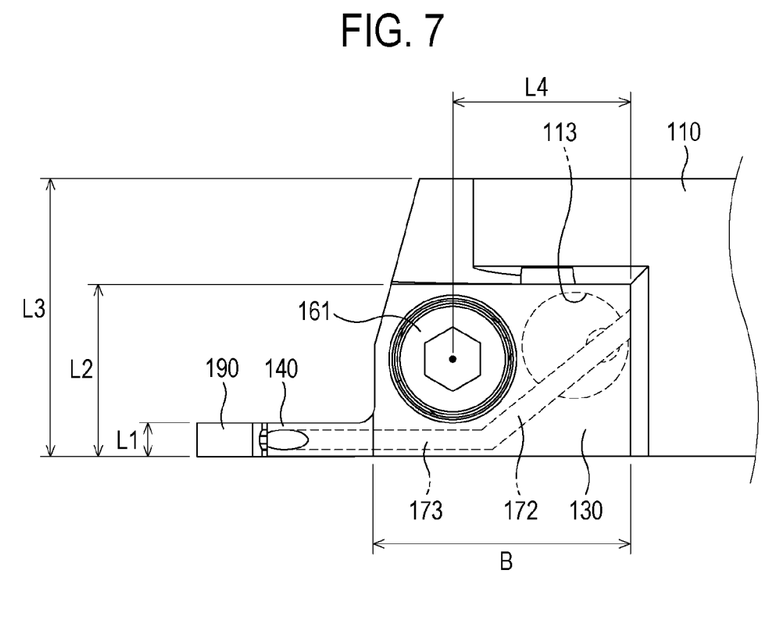
FIG. 7 is a partial plan view of the cutting tool assembly shown in FIG. 1.

FIG. 7 is a partial plan view of the cutting tool assembly shown in FIG. 1.

The width L2 of the clamping portion 130 is in the range of 40% to 80% of the width L3 of the tool body 110. When the width L2 of the clamping portion 130 is less than 40% of the width L3 of the tool body 110, the elastic force and elastic restoring force provided to the clamping portion 130 are too small, and the force of fastening the cutting insert 190 may be weakened. In this case, the lifespan of the cutting insert 190 may be shortened and the quality of the workpiece may be deteriorated. When the width L2 of the clamping portion 130 exceeds 80% of the width L3 of the tool body 110, the elastic force and elastic restoring force provided to the clamping portion 130 become too large. Thus, it is difficult to widen the gap between the top surface 111 of the tool body 110 and the bottom surface 131 of the clamping portion 130. In this case, it is difficult to mount the cutting insert 190 on the tool body 110.

In general, when the thickness of the elastic connecting portion 150 is increased, the elastic force and elastic restoring force provided to the clamping portion 130 decrease. In contrast, when the thickness of the elastic connecting portion 150 is decreased, the elastic force and elastic restoring force provided to the clamping portion 130 increase. Even when the thickness of the elastic connecting portion 150 is increased so that the upper coolant channel 170 can be formed in the interior of the elastic connecting portion 150, it is possible to prevent the elastic force and elastic restoring force provided to the clamping portion 130 from decreasing by setting the width L2 of the clamping portion 130 to a range of 40% to 80% of the width L3 of the tool body 110. Accordingly, it is not necessary to increase the length of the clamping portion 130 in order to provide a predetermined elastic force and a predetermined elastic restoring force. As a result, it is possible to achieve both of forming the upper coolant channel penetrating the elastic connecting portion 150 and providing a predetermined elastic force and elastic restoring force to the clamping portion 130.

Figure 8:
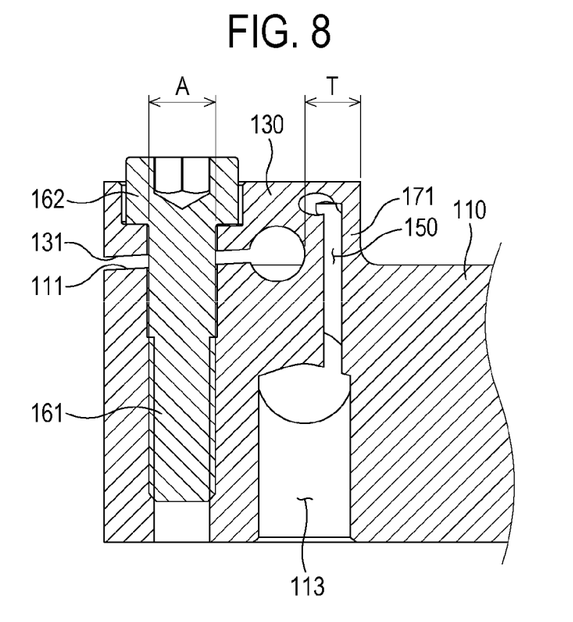
FIG. 8 is a partial cross-sectional view taken along the line VIII-VIII shown in FIG. 1.

FIG. 8 is a partial cross-sectional view taken along the line VIII-VIII shown in FIG. 1.

In one embodiment, the clamping screw 160, the elastic connecting portion 150, the upper jaw 140, and the clamping portion 130 may be configured to satisfy Equation 1 below.

$$\frac{A+T}{T} < \frac{L2}{T} < L2 - \frac{L1}{T} \qquad \text{Equation 1}$$

In Equation 1, as shown in FIG. 7, T is the thickness of the elastic connecting portion 150, L1 is the width of the upper jaw 140, and L2 is the width of the clamping portion 130. In addition, as shown in FIG. 8, A is the diameter of the threaded portion 161 of the clamping screw 160. By configuring the clamping screw 160, the elastic connecting portion 150, the upper jaw 140, and the clamping portion 130 to satisfy Equation 1, it is possible to derive an optimal condition for the elastic force and elastic restoring force provided to the clamping portion 130 and a fastening force of the cutting insert 190 by the clamping portion 130.

In one embodiment, the clamping portion 130 and the elastic connecting portion 150 may be configured to satisfy Equation 2 below.

$$2 \leq \frac{L2}{T} \leq 25 \qquad \text{Equation 2}$$

In Equation 2, L2 is the width of the clamping portion 130, and T is the thickness of the elastic connecting portion 150. When the ratio of the length L2 of the clamping portion 130 to the thickness T of the elastic connecting portion 150 is greater than 25, the elastic force and elastic restoring force provided to the clamping portion 130 may become too small. Thus, the force for fastening the cutting insert 190 may be weakened. In this case, the lifespan of the cutting insert 190 may be shortened, and the quality of the workpiece may be deteriorated.

When the ratio of the length L2 of the clamping portion 130 to the thickness T of the elastic connecting portion 150 is less than 2, the elastic force and elastic restoring force provided to the clamping portion 130 become too large. Thus, it is difficult to widen the gap between the top surface 111 of the tool body 110 and the bottom surface 131 of the clamping portion 130. In this case, it is difficult to mount the cutting insert 190 on the tool body 110.

In one embodiment, the clamping screw 160 and the elastic connecting portion 150 may be configured to satisfy Equation 3 below.

$$2 \leq \frac{A+T}{T} \qquad \text{Equation 3}$$

In Equation 3, A is the diameter of the threaded portion 161 of the clamping screw 160, and T is the thickness of the elastic connecting portion 150. When the right side of Equation 3 is less than 2, it is not possible to ensure a sufficient fastening force in which the clamping portion 130 firmly fixes the cutting insert 190 during the cutting operation.

In one embodiment, the upper jaw 140, the elastic connecting portion 150 and the clamping portion 130 may be configured to satisfy Equation 4 below.

$$L2 - \frac{L1}{T} \leq 25 \qquad \text{Equation 4}$$

In Equation 4, L1 is the width of the upper jaw 140, T is the thickness of the elastic connecting portion 150, and L2 is the width of the clamping portion 130. When the left side of Equation 4 exceeds 25, the elastic force and elastic restoring force provided to the clamping portion 130 may become too small. Thus, the force for fastening the cutting insert 190 may be weakened. In this case, the lifespan of the cutting insert 190 may be shortened, and the quality of the workpiece may be deteriorated.

In one embodiment, the clamping portion 130 and the clamping screw 160 may be configured to satisfy Equation 5 below.

$$\frac{L4}{T} < 3.5 \qquad \text{Equation 5}$$

In Equation 5, L4 is the length from the rear end of the clamping portion 130 to the center of the clamping screw 160, and T is the thickness of the elastic connecting portion 150. When the ratio of the length L4 of the clamping portion 130 to the thickness T of the elastic connecting portion 150 is equal to or greater than 3.5, the elastic force and elastic restoring force provided to the clamping portion 130 may become too small. Thus, the force for fastening the cutting insert 190 may be weakened. In this case, the lifespan of the cutting insert 190 may be shortened, and the quality of the workpiece may be deteriorated.

In one embodiment, the width L2 of the clamping portion 130 may be longer than the width L1 of the upper jaw 140, and the width L3 of the tool body 110 may be longer than the width L2 of the clamping portion 130. That is, in the upper jaw 140, the clamping portion 130, and the tool body 110, the relationship between the widths is equal to L1<L2<L3.

In one embodiment, in the clamping portion 130, the length B along the longitudinal direction may be longer than the width L2 along the width direction. The length B of the clamping portion 130 may be longer than the width L2 to provide a sufficient elastic force and elastic restoring force to the clamping portion 130.

Figure 9:
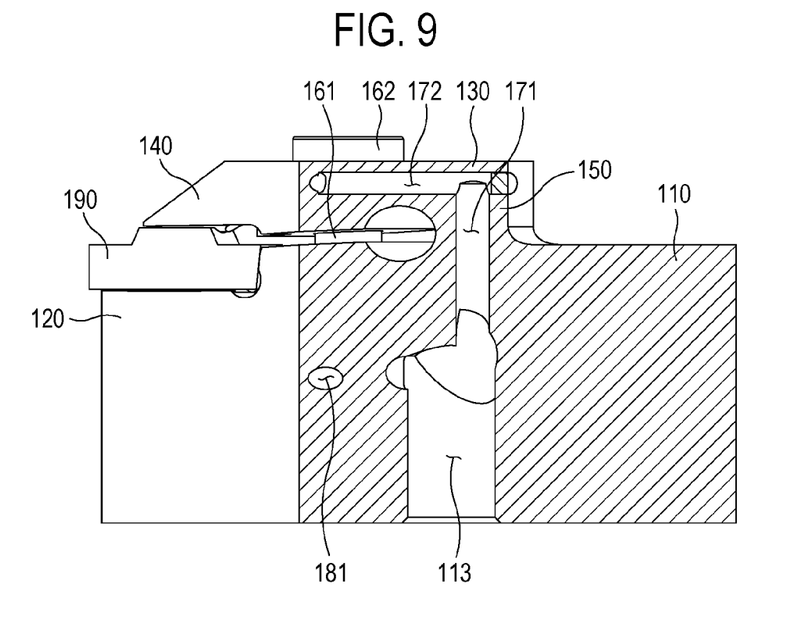
FIG. 9 is a cross-sectional view taken along the line IX-IX shown in FIG. 1.
Figure 10:
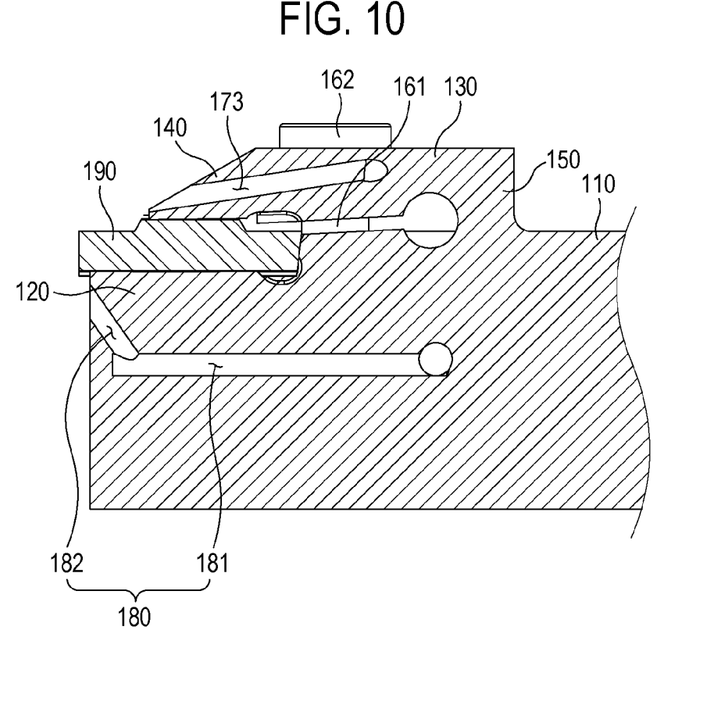
FIG. 10 is a partial cross-sectional view taken along the line X-X shown in FIG. 1.

FIG. 9 is a cross-sectional view taken along the line IX-IX shown in FIG. 1. FIG. 10 is a partial cross-sectional view taken along the line X-X shown in FIG. 1.

In one embodiment, the upper coolant channel 170 may include a first upper coolant channel 171, a second upper coolant channel 172, and a third upper coolant channel 173. As shown in FIG. 9, the first upper coolant channel 171 is formed in the interior of the elastic connecting portion 150 and is vertically disposed with respect to the top surface of the clamping portion 130. The second upper coolant channel 172 is formed in the interior of the clamping portion 130 and is vertically disposed with respect to the first upper coolant channel 171. As shown in FIG. 7, the second upper coolant channel 172 extends in a diagonal direction of the clamping portion 130 to avoid the clamping screw 160. As shown in FIG. 10, the third upper coolant channel 173 is formed in the interior of the upper jaw 140. The third upper coolant channel 173 is inclined downward with respect to the second upper coolant channel 172. Thus, the opening of the third upper coolant channel 173 through which the coolant is injected is disposed closer to the cutting insert 190. Accordingly, it is possible to inject the coolant toward the cutting edge of the cutting insert 190 at a high pressure.

In one embodiment, the cutting tool assembly 100 may further include a lower coolant channel 180 penetrating the tool body 110 and the interior of the lower jaw 120. Since the cutting tool assembly 100 includes the upper coolant channel 170 and the lower coolant channel 180, it is possible to improve the cutting performance of the cutting insert 190 and to prolong the lifespan of the cutting insert 190. In addition, due to using the coolant in the upper and lower sides, it is possible to generate and discharge the chips more smoothly. The upper coolant channel 170 and the lower coolant channel 180 may be configured to communicate with one coolant supply channel 113. The lower coolant channel 180 may include a first lower coolant channel 181 and a second lower coolant channel 182. As shown in FIG. 10, the first lower coolant channel 181 extends along the longitudinal direction of the tool body 110. The second lower coolant channel 182 may be inclined upward from the first lower coolant channel 181. Accordingly, since the opening of the second lower coolant channel 182 through which the coolant is injected is disposed closer to the cutting insert 190, it is possible to inject the coolant toward the cutting edge of the cutting insert 190 at a high pressure.

In one embodiment, the cutting tool assembly 100 may further include the cutting insert 190 inserted into the space between the lower jaw 120 and the upper jaw 140. The cutting insert 190 is inserted into the space between the lower jaw 120 and the upper jaw 140 in a sliding manner. After the cutting insert 190 is inserted into the space between the lower jaw 120 and the upper jaw 140, the upper jaw 140 presses the cutting insert 190 downward by the elastic restoring force of the clamping portion 130. Then, when the clamping screw 160 penetrates the clamping portion 130 and is fastened to the tool body 110, the pressing force of the upper jaw 140 transmitted via the clamping portion 130 is increased so that the cutting insert 190 can be strongly fixed. A concave portion corresponding to the support protrusion 122 of the lower jaw 120 may be formed in the bottom surface of the cutting insert 190, and a concave portion corresponding to the pressing protrusion 142 of the upper jaw 140 is formed in the top surface of the cutting insert 190.

With the cutting tool assembly according to one embodiment of the present disclosure, by setting the width of the clamping portion within a predetermined ratio of the width of the tool body, it is possible to provide the sufficient elastic force and the sufficient elastic restoring force to the clamping portion while including the upper coolant channel. Therefore, by injecting the coolant, it is possible to improve the cutting performance of the cutting insert and to prolong the lifespan of the cutting insert. In addition, the use of the coolant enables chips to be smoothly generated and discharged.

Although the present disclosure has been described in relation to some embodiments, it should be noted that there may be various modifications and changes without departing from the technical idea and scope of the present disclosure, which can be understood by those skilled in the art. In addition, such modifications and changes should be construed to belong to the scope of the claims appended herein.

What is claimed is:

1. A cutting tool assembly, comprising:
a tool body extending in a longitudinal direction;
a lower jaw extending and protruding forward from the tool body;
a clamping portion disposed to be spaced apart from a top surface of the tool body;
an upper jaw extending forward from the clamping portion and facing the lower jaw;
an elastic connecting portion elastically connecting the tool body and the clamping portion to each other on a rear side of the clamping portion;
a clamping screw penetrating the clamping portion downwardly and fastened to the tool body; and
an upper coolant channel through which coolant flows, the upper coolant channel penetrating an interior of the elastic connecting part, an interior of the clamping portion, and an interior of the upper jaw,
wherein, in a width direction perpendicular to the longitudinal direction, a width of the clamping portion is in a range of 40% to 80% of a width of the tool body.

2. The cutting tool assembly of claim 1, wherein the clamping screw, the elastic connecting portion, the upper jaw, and the clamping portion are configured to satisfy:

$$\frac{A+T}{T} < \frac{L2}{T} < L2 - \frac{L1}{T},$$

wherein:
A is a diameter of a threaded portion of the clamping screw,
T is a thickness of the elastic connecting portion,
L1 is a width of the upper jaw, and
L2 is the width of the clamping portion.

3. The cutting tool assembly of claim 1, wherein the clamping portion and the elastic connecting portion are configured to satisfy:

$$2 \leq \frac{L2}{T} \leq 25,$$

wherein:
L2 is the width of the clamping portion, and
T is a thickness of the elastic connecting portion.

4. The cutting tool assembly of claim 1, wherein the clamping screw and the elastic connecting portion are configured to satisfy:

$$2 \leq \frac{A+T}{T},$$

wherein:
A is a diameter of a threaded portion of the clamping screw, and
T is a thickness of the elastic connecting portion.

5. The cutting tool assembly of claim 1, wherein the upper jaw, the elastic connecting portion, and the clamping portion are configured to satisfy:

$$L2 - \frac{L1}{T} \leq 25,$$

wherein:
L1 is a width of the upper jaw,
T is a thickness of the elastic connecting portion, and
L2 is the width of the clamping portion.

6. The cutting tool assembly of claim 1, wherein the clamping portion and the clamping screw are configured to satisfy:

$$\frac{L4}{T} < 3.5,$$

wherein:
L4 is a length from a rear end of the clamping portion to a center of the clamping screw, and
T is a thickness of the elastic connecting portion.

7. The cutting tool assembly of claim 1, wherein:
the width of the clamping portion is longer than a width of the upper jaw, and
the width of the tool body is greater than the width of the clamping portion.

8. The cutting tool assembly of claim 1, wherein, in the clamping portion, a length along the longitudinal direction is greater than a width along the width direction.

9. The cutting tool assembly of claim 1, wherein the upper coolant channel includes:
a first upper coolant channel formed inside the elastic connecting portion, the first upper coolant channel being perpendicular to a top surface of the clamping portion;
a second upper coolant channel formed inside the clamping portion, the second upper coolant channel being perpendicular to the first upper coolant channel; and
a third upper coolant channel formed inside the upper jaw, the third upper coolant channel being inclined downward with respect to the second upper coolant channel.

10. The cutting tool assembly of claim 1, further comprising a lower coolant channel penetrating inside of the tool body and the lower jaw.

11. The cutting tool assembly of claim 1, further comprising a cutting insert inserted into a space between the lower jaw and the upper jaw.

12. The cutting tool assembly of claim 1, wherein:
the clamping screw, the elastic connecting portion, the upper jaw, and the clamping portion are configured to satisfy:

$$\frac{A+T}{T} < \frac{L2}{T} < L2 - \frac{L1}{T},$$

$$2 \le \frac{L2}{T} \le 25,$$

$$2 \le \frac{A+T}{T},$$

$$L2 - \frac{L1}{T} \le 25, \text{ and}$$

$$\frac{L4}{T} < 3.5,$$

wherein:
A is a diameter of a threaded portion of the clamping screw,
T is a thickness of the elastic connecting portion,
L1 is a width of the upper jaw,
L2 is the width of the clamping portion, and
L4 is a length from a rear end of the clamping portion to a center of the clamping screw.

13. The cutting tool assembly of claim 12, wherein:
the tool body has a width L3; and
L3>L2>L1.

14. The cutting tool assembly of claim 13, wherein:
the clamping portion has a length B along the longitudinal direction; and
B>L2.

15. The cutting tool assembly of claim 14 wherein the upper coolant channel includes:
a first upper coolant channel formed inside the elastic connecting portion, the first upper coolant channel being perpendicular to a top surface of the clamping portion;
a second upper coolant channel formed inside the clamping portion, the second upper coolant channel being perpendicular to the first upper coolant channel; and
a third upper coolant channel formed inside the upper jaw, the third upper coolant channel being inclined downward with respect to the second upper coolant channel.

16. The cutting tool assembly of claim 15, further comprising a lower coolant channel penetrating inside of the tool body and the lower jaw.

17. The cutting tool assembly of claim 15, wherein:
each of the first, second and third upper coolant channels is straight;
the first upper coolant channels is directly connected to the second upper coolant channel and forms a first angle therewith; and
the second upper coolant channel is directly connected to the third upper coolant channel and forms a second angle therewith which his different from the first angle; and
the third upper coolant channel opens to a front end of the upper jaw.

* * * * *